United States Patent Office 3,479,261
Patented Nov. 18, 1969

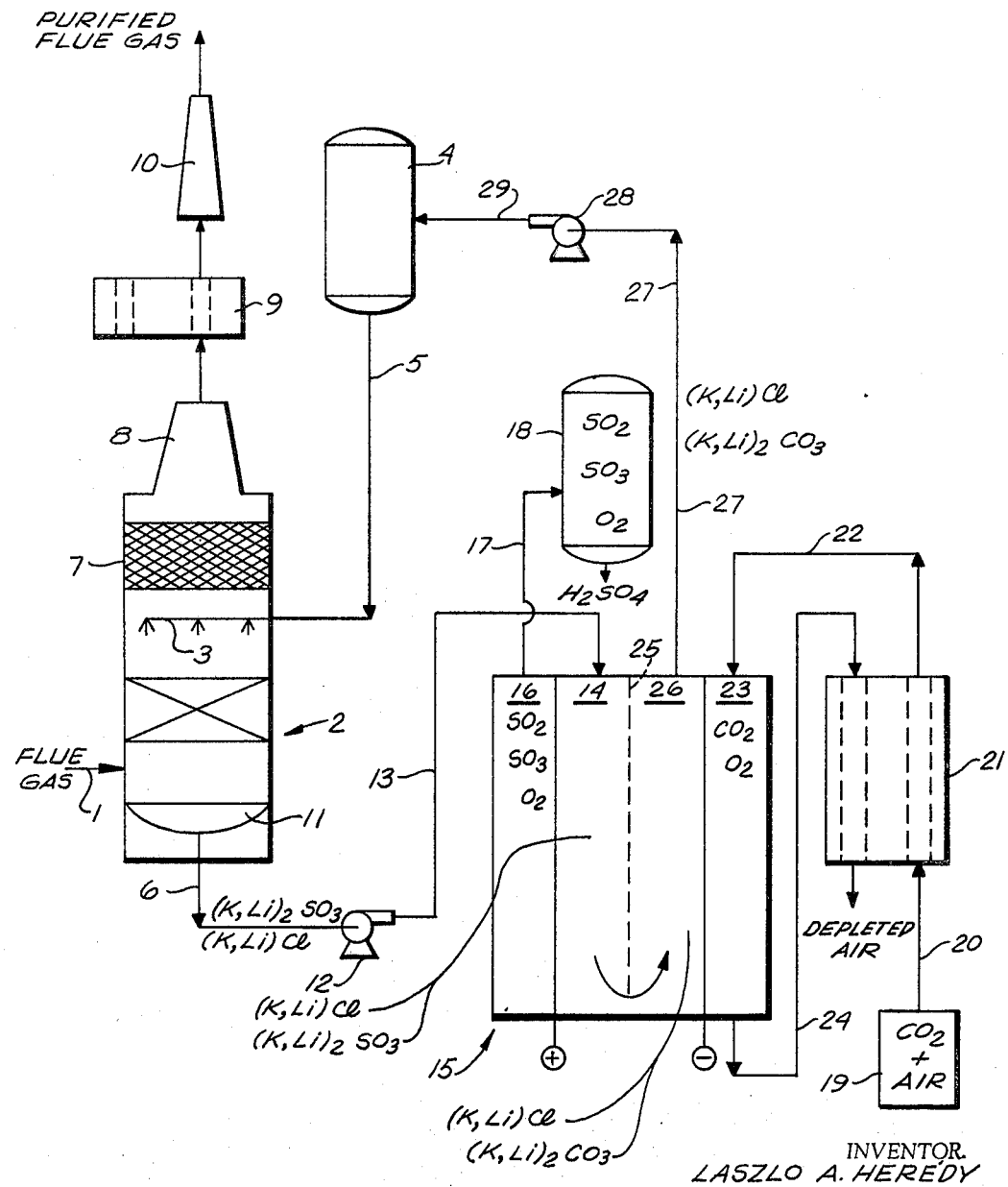

3,479,261
ELECTROCHEMICAL METHOD FOR RECOVERY OF SULFUR OXIDES
Laszlo A. Heredy, Canoga Park, Calif., assignor to North American Rockwell Corporation, a corporation of Delaware
Filed May 15, 1967, Ser. No. 638,364
Int. Cl. B01k 1/00
U.S. Cl. 204—61       5 Claims

ABSTRACT OF THE DISCLOSURE

A method for removing sulfur dioxide from flue gas by (1) absorption of the sulfur dioxide in a molten salt mixture containing alkali metal carbonate to form alkali metal sulfite and (2) electrochemical conversion of the formed sulfite to sulfur oxides and oxygen with simultaneous regeneration of the alkali metal carbonate.

Cross references to related applications

The method for removing sulfur dioxide from flue gas by absorption of the sulfur dioxide in a molten salt mixture containing alkali metal carbonate to provide a suitable feedstock for the electrochemical regeneration process of the present invention is described in patent application Ser. No. 638,528, now U.S. Patent No. 3,438,722, filed May 15, 1967, and assigned to the assignee of the present invention.

Various chemical regeneration processes that may be utilized for treatment of the resultant absorbent solution provided by the process described in Ser. No. 638,-528, now U.S. Patent No. 3,438,722, are described in the following patent applications, all filed May 15, 1967 and assigned to the assignee of the present invention: "Two-Stage Regeneration of Absorbent for Sulfur Oxides," Ser. No. 638,529, now U.S. Patent No. 3,438,728, "Absorbent Regeneration Using Carbon Regenerant," Ser. No. 638,-365, now U.S. Patent No. 3,438,727, "Sulfur Production Using Carbon Oxide Regenerant," Ser. No. 638,530, now U.S. Patent No. 3,438,734, and "Sulfur Production Using Carbon Regenerant," Ser. No. 638,366, now U.S. Patent No. 3,438,733.

Background of the invention

This invention relates to a process for the removal of sulfur compounds from hot combustion gases. It particularly relates to a process wherein the sulfur dioxide content of a flue gas is removed by absorption in a molten alkali metal carbonate-containing solution, and the carbonate absorbent is regenerated and sulfur values recovered from resultant absorbent solution.

Sulfur oxides, principally as sulfur dioxide, are present in the waste gases discharged from many metal refining and chemical plants and in the flue gases from electric power plants. The control of air pollution resulting from this discharge of sulfur oxide into the atmosphere has become increasingly urgent. An additional incentive for the removal of sulfur oxides from waste gases is the recovery of sulfur values otherwise lost by discharge to the atmosphere. However, particularly with respect to the flue gases from power plants, which based on the combustion of an average coal may contain as much as 3000 p.p.m. sulfur dioxide and 30 p.p.m. sulfur trioxide by volume, the large volumes of these flue gases relative to the quantity of sulfur which they contain make removal of the sulfur compounds from these gases expensive. Also, while the possible by-products, such as elemental sulfur and sulfuric acid, that may be ultimately obtained from the recoverable sulfur values have virtually unlimited markets as basic raw materials, they sell for relatively low figures. Consequently, low-cost recovery processes are required.

Many processes have been proposed and investigated for the desulfurization of flue gases. In a typical wet absorption process, the flue gas is washed with an alkaline aqueous solution or slurry. Thus the use of an aqueous slurry of calcium hydroxide or calcium carbonate has been investigated in several British power plants. In other wet processes, aqueous ammonia or aqueous sodium sulfite solutions have been utilized as washing fluids. While these wet processes have some advantageous features, they all suffer from the common drawback of the flue gas being cooled substantially and becoming saturated with water vapor in the absorption tower. This cooling of the gas decreases the overall efficiency of the process because of the additional power requirements for dispersal of the flue gas to the atmosphere. Further, the associated condensation and precipitation of evaporated water containing contaminants in the surrounding environment creates substantial problems. In the dry processes using solid adsorbents, sulfur dioxide is removed either by chemical reaction with the adsorbent or by adsorption followed by oxidation of the adsorbed sulfur dioxide. In one such process shown in U.S. Patent 2,718,453, finely powdered calcium carbonate is blown into the combustion gas to form calcium sulfate or calcium sulfite. In general a reaction between a solid and gas is relatively slow and inefficient, being limited to the available surface area of the solid. Also, the resultant products do not readily lend themselves to regeneration of the starting carbonate material or recovery of the removed sulfur values.

In one regenerative dry process, the flue gas is contacted with activated lignite char at about 200° C., sulfur dioxide being adsorbed and converted immediately by the oxygen and water present in the flue gas to sulfuric acid. The char is regenerated by heating at about 400° C. to yield a desorbed gas of high sulfur dioxide content. In another dry process, pellets of alkalized aluminia are used as adsorbent to remove sulfur dioxide. Undesirably, this adsorbed material is oxidized to sodium sulfate by the catalytic action of the alkalized alumina. The saturated adsorbent is regenerated by heating it at 60° C. with a reducing gas. The solid adsorbent processes are disadvantageous in being surface area limited and further because of the difficulties involved in the handling and moving of large quantities of the solid adsorbent which would be required in large-scale process applications.

In a catalytic oxidation process, sulfur dioxide is converted to sulfur trioxide at a temperature of about 400–430° C. by catalytic oxidation using alumina-supported platinum or vanadia catalysts, followed by hydration to sulfuric acid. While the concept of direct oxidation is potentially attractive, very extensive prior purification of the flue gas is required to avoid poisoning of the catalyst and contamination of the produced sulfuric acid. Also, the resultant 70 weight percent sulfuric acid produced is such a process is very corrosive at the condensation temperature involved, and therefore requires the use of very large and expensive corrosion-resistant equipment. Further, sulfuric acid of this concentration has a very limited market.

SUMMARY OF THE INVENTION

It is an object of the present invention to provide a highly efficient method for the removal of sulfur dioxide and sulfur trioxide from flue gases using inexpensive, readily available materials and avoiding the use of expensive equipment. In addition to the absorption stage, the process includes electrochemical regeneration of the absorbent and recovery of sulfur values in a form readily convertible to sulfuric acid.

In accordance with this invention, a sulfur removal process is provided comprising the separate sequential stages of absorption using an alkali metal carbonate-containing molten salt and electrochemical regeneration using carbon dioxide and oxygen as cathodic feed material.

In the absorption stage, sulfur oxides present in a hot combustion gas generally produced by burning a sulfur-containing hydrocarbon or fossil fuel are removed from the combustion gas by contacting the gas at a temperature of at least 325° C., suitably between 325 and 650° C., with a molten salt mixture containing alkali metal carbonates as active absorbent to thereby remove the sulfur oxides. The melting temperature of the salt mixture is preferably between 325 and 450° C. The resultant sulfur compound that is formed consists principally of alkali metal sulfite, derived from the sulfur dioxide, and may also contain alkali metal sulfate, derived from the $SO_3$ initially present or formed by oxidation of a portion of the formed sulfite. Preferably, no more than a stoichiometric amount of alkali metal carbonate absorbent is supplied in the molten salt for reaction with $SO_2$ and $SO_3$, so that substantially all of this alkali metal carbonate is converted to alkali metal sulfite and sulfate.

For the electrochemical regeneration, the alkali metal sulfite and sulfate are converted to a mixture of $SO_3$, $SO_2$, and $O_2$ gases in the anode compartment of an electrolysis cell. Carbon dioxide and a source of oxygen, preferably air, are fed to the cathode compartment to regenerate alkali metal carbonate for recirculation in the process. The gaseous mixture of $SO_2$, $SO_3$, and $O_2$ is recovered as a suitable feedstock for a sulfuric acid plant. The electrochemical regeneration is performed at a temperature of at least 325° C. at which the alkali metal sulfite-containing salt is molten, suitably between 325 and 650° C. A temperature between 375 and 475° C. is preferred.

Consistent with kinetic requirements for both the absorption and electrochemical regeneration, lower temperatures are generally favored for both stages to minimize corrosion effects. Thus, while an overall process temperature between 325 and 650° C. at which the salt mixture is molten may be utilized, a temperature between 375 and 475° C. is preferred.

Brief description of the drawing

The sole figure of the drawing shows a schematic flow diagram illustrating the absorption and electrochemical regeneration stages of a preferred embodiment of the invention for the treatment of hot combustion gases obtained by the burning of a sulfur-containing fossil fuel in an electric generating plant.

Description of the preferred embodiments

The present invention is broadly directed to an improved method of electrochemical regeneration for treating an absorbent solution obtained by absorption of sulfur oxides in a molten salt mixture containing alkali metal carbonates as reactive absorbent. The absorption stage per se is described and claimed in S.N. 638,528, now U.S. Patent No. 3,348,722, which is incorporated herein by reference, and the foregoing copending application should be consulted for further details of the absorption stage for providing a suitable feedstock for use in the present process. In the absorption stage, sulfur oxides present in a hot combustion gas generally produced by burning a sulfur-containing hydrocarbon or fossil fuel are removed from the combustion gas by contacting the gas at a temperature of at least 325° C. with a molten salt mixture containing alkali metal carbonates as active absorbent to thereby remove the sulfur oxides.

However, because of the subsequent electrochemical regeneration in which $SO_2$ and $SO_3$ are produced and because of the reactivity of $SO_2$ and $SO_3$ with alkali metal carbonate to form, respectively, alkali metal sulfite and sulfate, the presence of excess amounts of alkali metal carbonate in the molten salt is not desirable. Thus, in a preferred aspect of practicing the absorption stage, the combustion gas is treated with a molten salt mixture containing the minimal required amount of alkali metal carbonate to react completely with the $SO_2$ and $SO_3$ in the flue gas for conversion, respectively, to alkali metal sulfite and sulfate. Thus, the reactive alkali metal carbonates ordinarily constitute only a minor component of the absorbent melt, generally less than 30 mole percent.

The present invention will be particularly illustrated with respect to the removal of sulfur oxides from hot combustion gases obtained by the burning of sulfur-containing fossil fuels, particularly in electric generating plants. Referring to the drawing, a flue gas obtained from the combustion of a sulfur-containing coal is admitted at a temperature of about 425±25° C. by way of a conduit 1 to an absorber unit 2. For a typical 1000-mwe. coal-fired electric utility plant utilizing coal containing 3 wt. percent sulfur, about 4,650,000 cubic ft./min. flue gas with an $SO_2$ content of about 0.18 vol. percent is generated. The flue gas is passed through a fly ash precipitator (not shown) to remove fine particles entrained therein, prior to entry into the absorber. For a 1000-mwe. plant, absorber unit 2 ordinarily consists of five stainless steel cyclone spray towers in parallel arrangement. These are suitably insulated with about 5 inches of high temperature insulation so that the temperature drop within them is less than five degrees centigrade.

The flue gas enters tangentially at the base of absorber 2 and travels upwardly with a velocity of about 20 ft./sec. It is contacted countercurrently by a spray of molten salt containing alkali metal carbonate (M.P. of salt about 375° C.) which is discharged through a spray distributor 3 located about 15 ft. above the base of the absorber tower. The molten salt containing between 2 and 30 mole percent carbonate is contained in a storage vessel 4, which is suitably insulated and equipped with heaters so as to maintain the carbonate-containing salt in a molten state. The molten salt leaves vessel 4 by way of a conduit 5 connected to spray distributor 3 at a flow rate adjusted to provide substantially complete conversion of carbonate to sulfite, so that about 2–30 mole percent sulfite content in the effluent molten salt stream leaves the bottom of absorber 2 by way of a conduit 6.

Because of the rapidity of the chemical reaction between the carbonate in the melt and the gaseous sulfur dioxide to form alkali metal sulfite, a gas residence time of less than a second is sufficient for a spray height of 15 feet. In addition to the chemical reaction requirements, the flow rate of the flue gas is also determined by the need for minimizing entrainment and pressure drop in the absorber as well as by the spray distribution pattern of the molten salt. Any of various well-known contact methods and equipment may be used to insure rapid reaction between the gaseous sulfur dioxide and the molten liquid salt such as use of wet-wall contactors or packed columns or absorbers containing perforated plates or bubble-cap trays. However, the spray technique is generally preferred because of its relative simplicity and efficiency.

After contacting the molten salt spray, the desulfurized flue gas flows past distributor 3 into a wire demister 7, which is about one foot thick and located in the upper section of the absorber tower about two feet above the distributor. The demister serves to remove entrained salt-containing droplets from the flue gas, which is then passed through a conical transition section 8 to minimize pressure drops in the absorber tower and then through a plurality of heat exchangers 9, from which it emerges at a temperature of about 150° C. Heat exchangers 9 may serve as preheaters for the water and the air used in the generating plant. The cooled flue gas from heat exchangers 9 is discharged to the atmosphere through a power plant stack 10. Conventional power plant stacks are 400 to 800 feet high so that mixing in the atmosphere will considerably reduce the ground level concentration of the sulfur dioxide ordinarily present in the emitted stack gases. Since the present process is capable of eliminating 99.9 vol. percent of the sulfur dioxide content of the flue gas, the resultant ground level concentration of sulfur dioxide under ideal conditions is virtually non-existent, i.e., less than one part per billion.

The molten salt mixture in vessel 4 contains the alkali metal carbonates which serve as active absorbent. Because of the subsequent requirements of electrochemical regeneration, the melt utilized contains preferably a minimal amount of alkali metal carbonate, sufficient only to satisfy the stoichiometric requirements based on reaction with the $SO_2$ and $SO_3$ present in the flue gas. Any excess amount of alkali metal carbonate in the molten salt fed to the electrolysis cell will react with generated $SO_2$ and $SO_3$, resulting in a waste of electrical energy and corresponding loss in cell efficiency. Thus, in the practice of this invention the excess carbonate is not suitable as a molten solvent for the active molten absorbent. Preferably a chloride salt carrier is used. A preferred composition, for example, a lithium-potassium salt mixture containing chloride and carbonate, is molten at a temperature of 375° C. Either a single alkali metal carbonate or a binary or ternary mixture of the alkali metal carbonates may be utilized with the noncarbonate salt carrier, the final mixture containing two or more alkali metal cations. In such a system, as little as 2 mole percent of alkali metal carbonate may be present with the remaining 98 mole percent being an inert diluent carrier, although generally at least 5–10 mole percent of alkali metal carbonate is preferable. Illustrative of such a suitable and preferred mixture is one utilizing LiCl-KCl eutectic (M.P. 348° C.) wherein the starting salt ratio consists of 64.8 mole percent LiCl and 35.2 mole percent KCl. An absorbent molten mixture containing 90 mole percent of the LiCl-KCl eutectic and 10 mole percent of potassium and lithium carbonates of a corresponding molar ratio has a melting point of about 375° C. Suitable chloride-carbonate molten salt mixture contain, in mole percent, 15–60 $K^+$, 40–85 $Li^+$, and 0–20 $Na^+$, as cations, and 70–98 $Cl^-$ and 2–30 $CO_3^=$ as anions. The amount of anionic component present will be determined by the amount of $SO_2$ and $SO_3$ to be removed. For a typical flue gas containing no more than 3000 p.p.m. $SO_2$, the anionic mole percent will vary from about 80–98 $Cl^-$ and 2–20 $CO_3^=$. The present invention will therefore be illustrated with a molten salt absorbent utilizing 90 mole percent of the LiCl-KCl eutectic and 10 mole percent of potassium and lithium carbonates of a corresponding molar ratio, which has a melting point of about 375° C.

The sulfite-containing molten salt resulting from the rapid reaction beween the molten alkali carbonate and the sulfur oxides in the flue gas is collected in a dished bottom heated sump 11 of absorber 2. After absorption, the molten salt contains a minimal amount of excess unreacted carbonate and consists essentially of a molten solution of potassium-lithium sulfite in excess potassium-lithium chloride. The sulfite-chloride mixture is pumped from sump 11 of absorber 2 through conduit 6 by way of a pump 12, then through a conduit 13 to an anode compartment 14 of an electrolysis cell 15 of stainless steel or other corrosion-resistant material. The sulfite-chloride mixture is at a temperature of about 425±25° C. The melt flows downward, gradually losing first sulfite and then sulfate. The remaining melt, principally chloride, flows from the bottom of the anode compartment into the cathode compartment. $SO_2$, $SO_3$, and $O_2$ mixture evolves on the porous positive electrode and is collected in the anode gas chamber 16. The porous positive electrode separating compartments 14 and 16 is porous to the passage of gases but impermeable to the melt. The formed gaseous mixture leaves anodic gas compartment 16 by way of a conduit 17 and is fed to a sulfuric acid plant, shown as a storage vessel 18.

Although the reactions occurring in the anode compartment are relatively complex and are but imperfectly understood, and the following explanation is not to be construed as limiting the present invention, the anodic cell reactions may be formulated as follows:

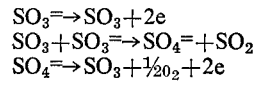

The overall anode reaction may be written as:

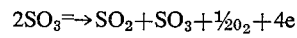

For the cathodic reaction, a mixture of carbon dioxide and air from a suitable source 19 is fed by way of a conduit 20 to a heat exchanger 21, where its temperature is increased, and then is fed by way of a conduit 22 to a cathodic gas compartment 23 of electrolysis cell 15. After reaction, depleted air is removed from compartment 23 by way of a conduit 24, the depleted air giving up heat by passage through heat exchanger 21.

In cell 15, a porous separator 25 prevents mixing of the melts in anode compartment 14 and in a cathode compartment 26, while at the same time being permeable to the passage of ions therethrough. For the cathodic reaction, the chloride melt from compartment 14 enters at the bottom of compartment 26 and reacts at the porous negative electrode to form alkali metal carbonate in excess carrier chloride. This molten salt is pumped from cathode compartment 26 through a conduit 27 by means of a pump 28 through a conduit 29 for return to storage vessel 4 and recirculation in the process.

The cathode reaction is a well-known one and may be formulated as follows:

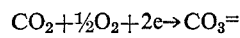

Such a reaction is utilized extensively in high temperature fuel cell operations, as shown for example in the description of the reaction and typical electrode structures therefor by E. Gorin and H. L. Recht, "High Temperature Fuel Cells," in Fuel Cells (W. Mitchell, ed.), pp. 210–212, Academic Press, New York, 1963. For a representative electrolysis cell, the cathode is constructed of porous lithiated NiO ceramic. Silver may also be used for a cathode structure in the form of 80-mesh gauze. While effective in this form, a finer mesh gauze or a silver powder activator gives better performance. At current densities up to 0.1 amp./cm.$^2$, both silver and lithiated NiO cathode structures are free from electrode polarization.

Combining the anode and cathode cell reactions, the overall cell reaction may be formulated as follows:

For the regeneration stage, electrical energy is supplied to cell 15 in accordance with the indicated polarities. Without considering polarization effects, the required minimal cell voltages for regeneration are 0.1 volt for sulfite electrolysis and 1.1 volts for sulfate electrolysis. The electrolysis of sulfite and evolution of $SO_2$ gas from the melt therefore occurs before electrolysis of sulfate, which is either originally present or formed during the course of the reaction. Losses due to polarization and cell resistance will require use of higher voltages under actual cell operating conditions. However, the effective cell voltage must be kept below the higher cell voltage for chlorine formation so that electrolysis of chloride does not occur. Otherwise, contamination by chlorine of the feedstock gases to the sulfuric acid plant will result.

The following examples illustrate the practice of this invention but are not to be construed as unduly limiting its generally broad scope.

EXAMPLE 1.—ABSORPTION OF $SO_2$ BY MELTS CONTAINING FRACTIONAL CARBONATE CONCENTRATIONS

A reciprocal salt system was prepared by mixing 40 grams of a LiCl-KCl eutectic (58 mole percent LiCl, 42 mole percent KCl, M.P. 348° C.) with 10 grams $Li_2CO_3$ and 5.34 grams KCl. The material was premelted in air and appeared to transform into a viscous melt at a temperature between 350 and 375° C. The analysis of the melt composition was as follows:

INITIAL MELT COMPOSITION

| Substance | Grams | Wt. percent | Cationic or anionic, mole percent |
|---|---|---|---|
| $Li^+$ | 4.76 | 8.8 | 65.6 |
| $K^+$ | 14.02 | 25.8 | 34.3 |
| $Cl^-$ | 27.44 | 50.5 | 85.1 |
| $CO_3^{2-}$ | 8.13 | 15.0 | 14.9 |

Pure $SO_2$ was used as the feed gas, the flow rate being varied from 9 to 14 ml./min. This feed gas was bubbled through about 1½–2 in. of the melt which was maintained in a quartz tube immersed in a KCl-LiCl eutectic constant temperature bath held at 400° C. The percent of absorption of the $SO_2$ by the melt as it bubbled through decreased from 100% to 98.4% after the flow rate had been increased to 14 ml./min. and 65% of the carbonate had been converted to sulfite. Thus, a KCl-LiCl melt containing less than 15 mole percent carbonate removed more than 99% of the $SO_2$ gas bubbled through it; more than 98% of the $SO_2$ gas was picked up in a melt containing only about 5 mole percent carbonate. The freezing point of the final lithium-potassium salt mixture containing approximately 85, 10, and 5 mole percent chloride, sulfite, and carbonate, respectively, was 325° C. compared with the 350–375° C. range of the starting composition. The test results are indicative that melts containing as little as 2 mole percent carbonate would remove more than 90% of the $SO_2$ content of gases bubbled through them.

EXAMPLE 2.—ELECTROCHEMICAL REGENERATION

A quartz U-tube was used which contained a salt consisting of 0.063 mole $K_2SO_3$ dissolved in a LiCl-KCl eutectic. Sufficient LiCl was then added to give a final K:Li ratio of 1:3.32. The melting point of the salt solution was 335° C. The anode reaction was performed in this cell at a temperature of about 400° C., the reaction gases being absorbed by passage through two 1.1 molar NaOH absorption traps. Various electrode materials (Ni, C, and Pt) and current densities (0.05–0.5 amp/cm.²) were used for several runs. All three electrode materials were found suitable. At high current densities, above 0.3 amp/cm.², some choride ion was also discharged at the anode due to concentration polarization in the melt. However, at lower current densities, below 0.2 amp/cm.², the discharge of chloride was avoided. The run was carried out for 3 hours, which was sufficient for electrolytic discharge of most of the sulfite present. Analysis of the collected gases and of the melt showed that the principal anodic products formed from $(K, Li)_2SO_3$ were $SO_2$ and $(K,Li)_2SO_4$, as predicted for the run.

It will of course be realized that many variations in reaction conditions may be used in the practice of this invention, depending in part upon the particular sulfur oxide content of the flue gas to be desulfurized, as well as the hydrocarbon or fossil fuels serving as the source of combustion gas. The term "hydrocarbon or fossil fuel" broadly includes carbonaceous fuels, such as coal, oil-shale, petroleum products, natural gas, and associated waste products, such as acid sludges and tars.

While certain exemplary reactions have been described for the absorption and electrochemical stages, it has been found, particularly with respect to the electrochemical regeneration, that the actual mechanism of regeneration is a highly complex one and several competing reactions may occur simultaneously. Therefore, to optimize each of the absorption and regeneration stages, varying reaction temperatures and pressures may be employed. For the electrochemical regeneration, different electrode structures, cell designs, and operating parameters may also be used. Further, a batch process or a continuous process, preferably the latter, may be used, with the usual provision for recycle of various unreacted or partially reacted components. Also, even when the desired reactions do not go to completion and products are additionally present produced by competing or undesired side reactions, the unreacted or undesired products may be recycled in the the process without substantial interference with the basic absorption and regeneration stages.

With respect to electrochemical regeneration, it is important that during the prior absorption step the carbonate in the absorbent be converted to sulfite as completely as possible. Any carbonate which remains in the molten salt mixture will react with the $SO_2$ or $SO_3$ generated during electrolysis, forming, respectively, sulfite and sulfate, and generating carbon dioxide gas. The net result of these side reactions is a decrease in the current efficiency of the electrolysis.

It should further be noted that when a melt containing sulfite, sulfate, and chloride of the alkali metals is electrolyzed, the anions are electrolytically discharged in the order of increasing decomposition potential, sulfite first discharging, followed by sulfate, and then by chloride. Thus, when the electrolysis is carried out at a suitable effective cell potential below the decomposition potential of alkali metal halides, only sulfite and sulfate will be discharged.

The present process has been illustrated with respect to the removal of $SO_2$ gas by its initial conversion to sulfite. However, the presence in the flue gas of $SO_3$, which is ordinarily but a minor fraction of the sulfur oxide content, does not interfere with the operation of the process. Thus, any $SO_3$ gas initially present is converted to alkali metal sulfate and fed to the electrolytic cell along with the sulfite-containing molten salt mixture. During the regeneration stage, the sulfate will also be converted. Thus, while the examples illustrating this invention have been described with respect to specific reactants, concentrations, times, temperatures, and other reaction conditions, the invention may be otherwise practiced, as will be readily apparent to those skilled in this art. Accordingly, this invention is not to be limited by the illustrative and specific embodiment thereof, but its scope should be determined in accordance with the claims thereof.

I claim:

1. The process for removing sulfur dioxide from hot combustion gas produced by burning a sulfur-containing hydrocarbon fuel which comprises
    contacting the sulfur dioxide-containing combustion gas with an initial molten salt mixture containing alkali metal carbonates as active absorbent for said sulfur dioxide to convert the carbonate in the melt to the sulfite of said alkali metals,
    feeding the alkali metal sulfite-containing molten salt at a first preselected rate to the anode compartment of an electrolysis cell,
    feeding gaseous mixture containing carbon dioxide and oxygen at a second preselected rate to a cathode compartment of said electrolysis cell, and
    supplying electrical energy to said electrolysis cell to electrochemically convert alkali metal sulfites in the melt to a gaseous mixture of $SO_2$, $SO_3$ and $O_2$ as a recoverable product and regenerate alkali metal carbonates in the melt for recirculation in the process.

2. The process according to claim 1 wherein the temperature for both the absorption and electrochemical reaction is maintained between 325 and 650° C.

3. The process according to claim 2 wherein said initial molten salt mixture is molten at a temperature between 325 and 450° C. and contains an alkali metal carbonate as active absorbent and an alkali metal chloride as carrier therefor, the molten salt mixture containing at least two alkali metal cations.

4. The process according to claim 3 wherein said initial molten salt mixture contains, in mole percent, 15–60 $K^+$, 40–85 $Li^+$, and 0–20 $Na^+$ as cations and 70–98 $Cl^-$ and 2–30 $CO_3^=$ as anions.

5. The process according to claim 1 wherein the source of oxygen fed to the cathode compartment is air.

References Cited

UNITED STATES PATENTS 3,085,053    4/1963    Taylor      204—60

FOREIGN PATENTS 1,437,484    3/1966    France.

OTHER REFERENCES

"Electrochemical Studies in Molten $Li_2CO_3$–$Na_2CO_3$," Bartlett et al., J.E.C.S., vol. 114, No. 5.

JOHN H. MACK, Primary Examiner

D. R. VALENTINE, Assistant Examiner

U.S. Cl. X.R.

204—60

PO-1050
(5/69)

UNITED STATES PATENT OFFICE
CERTIFICATE OF CORRECTION

Patent No. __3,479,261__   Dated __November 18, 1969__

Inventor(s) __L. A. Heredy__

It is certified that error appears in the above-identified patent and that said Letters Patent are hereby corrected as shown below:

Column 2, line 43, change "60°" to --600°--.

Column 5, line 36, after "utilizing" insert --a--; line 56, after "alkali" insert --metal--; line 67, change "+" to --$\pm$--.

Column 6, line 11, change "$1/20_2$" to --$1/2\ O_2$--; line 14, change "$1/20_2$" to $1/2\ O_2$--.

Column 7, line 27, change "$CO_2^-$" to --$CO_3^=$--; line 61, change "choride" to --chloride--.

Column 8, line 71, after "feeding" insert --a--.

Signed and sealed this 9th day of May 1972.

(SEAL)
Attest:

EDWARD M. FLETCHER, JR.
Attesting Officer

ROBERT GOTTSCHALK
Commissioner of Patents